United States Patent [19]

Whyzmuzis et al.

[11] Patent Number: 4,508,868

[45] Date of Patent: Apr. 2, 1985

[54] POLYMERIC FAT ACID POLYAMIDE RESINS FOR USE IN FLEXOGRAPHIC INK VEHICLES HAVING REDUCED SOLVENT EMISSIONS

[75] Inventors: Paul D. Whyzmuzis, Plymouth; Anne E. Spinks, Minneapolis, both of Minn.

[73] Assignee: Henkel Corporation, Minneapolis, Minn.

[21] Appl. No.: 594,514

[22] Filed: Mar. 29, 1984

[51] Int. Cl.³ .............................................. C08G 69/34
[52] U.S. Cl. .......................... 524/607; 260/DIG. 38; 260/404.5; 106/27; 524/606; 528/339.3
[58] Field of Search ............. 260/DIG. 38, 404.5 PA; 524/606, 607; 528/339.3; 106/27

[56] References Cited

U.S. PATENT DOCUMENTS

| | | | |
|---|---|---|---|
| 2,886,543 | 5/1959 | Peerman et al. | 528/339.3 |
| 3,157,681 | 11/1964 | Fischer | 260/404.5 PA |
| 3,224,893 | 12/1965 | Floyd et al. | 106/27 |
| 3,253,940 | 5/1966 | Floyd et al. | 106/27 |
| 3,412,115 | 11/1968 | Floyd et al. | 260/404.5 PA |
| 3,420,789 | 1/1969 | Wilson | 528/339.3 |
| 3,622,604 | 11/1971 | Drawert | 528/339.3 |
| 3,652,469 | 3/1972 | Glaser et al. | 106/27 |
| 3,776,865 | 12/1973 | Glaser et al. | 260/404.5 PA |
| 3,900,436 | 8/1975 | Drawert et al. | 106/27 |

*Primary Examiner*—Ronald W. Griffin
*Attorney, Agent, or Firm*—Patrick J. Span; Ernest G. Szoke

[57] ABSTRACT

Polymeric fat acid polyamides are disclosed useful in the flexographic ink industry, to provide products which will comply with environmental protection standards. The improvement lies in the use of acid termination with acid values of 8–20 and a sufficient amount of unsaturated monomeric fatty acids to provide a molecular weight product which will permit relatively high solids levels and reduced solvent emission while maintaining good ink varnish properties.

14 Claims, No Drawings

POLYMERIC FAT ACID POLYAMIDE RESINS FOR USE IN FLEXOGRAPHIC INK VEHICLES HAVING REDUCED SOLVENT EMISSIONS

BACKGROUND OF THE INVENTION

This invention relates to an improvement in polymeric fatty acid polyamides useful in the flexographic ink industry, to provide products which will comply with environmental protection standards. The improvement lies in the use of acid termination and a sufficient amount of unsaturated monomeric fatty acids to provide a molecular weight product which will permit relatively high solids levels and reduced solvent emission while maintaining good ink varnish properties.

Flexographic inks are solvent based inks applied by rollers or pads to flexible sheets of plastic foil and paper. It is necessary that flexographic ink binders be found which will have certain properties. The practical aspects of the use of these ink resins and the inks derived therefrom require that the polyamide resin be soluble in alcohol solvents, and such solubility must be attained without sacrificing toughness, adhesion and gloss.

U.S. Pat. No. 3,253,940 was one solution to provide greatly improved solubility in alcoholic solvents, particularly ethanol. This was accomplished through the use of relatively short chain or lower aliphatic monobasic acids in the preparation of polymeric fat acids polyamides of diamines such as ethylene diamine. Illustrative of such lower monobasic acids were those having up to 5 carbon atoms such as acetic acid, propionic acid, butyric acid and the like. In U.S. Pat. No. 3,224,893 the hydroxy monocarboxylic acids were employed in such polymeric fat acid polyamides. Varnishes of the polyamides of these patents in alcohol solvents were on the order of 35% by weight non-volatile solids.

The foregoing provided resins which could be employed with the usual alcoholic solvents. However, as environmental solutions were sought, efforts were made to reduce emissions such as those from the volatile alcohol solvents. One means of reducing the emission was to provide water reducible polymeric fat acid polyamides as illustrated in U.S. Pat. No. 3,776,865. As disclosed therein, this was achieved by acid termination of the polymeric fat acid polyamides employing an acid component of the polymeric fat acid and another co-dicarboxylic acid and an amine component comprising isophorone diamine alone or in admixtures with conventional diamines such as the alkylene diamines, i.e. ethylene diamine. Acid termination was achieved by employing about 50-75 amine equivalents per 100 carboxyl equivalents. Varnishes of these resins in an alcohol solvent such as n-propanol on the order of about 40% nonvolatile solids are disclosed.

Another U.S. patent, U.S. Pat. No. Re. 28,533 dealing with polymeric fat acid polyamides employing lower aliphatic monobasic acids, such as acetic and propionic, with certain amine combinations disclosed a few solubilities in ethanol up to 60% percent though many were 50% or below.

As environmental standards have become more and more stringent, efforts have continued to provide resins which comply with such standards. High solids varnishes on the order of 55-60%, and preferably above 60%, which when formulated into pigmented inks will meet such solvent emission standards which are desired in order to reduce solvent emissions. The development of lower molecular weight resins will provide for higher solids varnishes. However, this must be accomplished without significant effect on other properties required for flexographic ink use. Such requirements generally include:

(a) good solubility in ink varnish-high solids p1 (b) very low viscosity at 60% solids
(c) gel resistance
(d) toughness—non-tacky
(e) adhesion
(f) gloss

BRIEF SUMMARY OF THE INVENTION

It has now been discovered that polymeric fat acid polyamides which are suitable for providing high solids varnishes for flexographic inks can be prepared which will comply with current standards of reduced solvent emission, while retaining the properties necessary otherwise for flexographic ink applications. Such polyamides are those prepared from polymeric fat acids and diamines which include in the acid component an unsaturated fatty acid monomer and which employ relative amine and carboxyl amounts so as to provide an acid terminated product having an acid value in the range of 8-20 and preferably in the range of 10-15.

These products can be employed in alcoholic ink varnishes at levels of 60% solids or higher while maintaining good overall ink properties including viscosity, softening point, color and gel resistance.

DETAILED DESCRIPTION

As indicated, the present invention relates to certain acid terminated polymeric fat acid polyamides which are suitable for providing high solids varnishes from which flexographic inks can be prepared which will comply with current standards for reduced solvent emission.

The polyamides of the present invention are prepared by reacting (a) an acid component comprising a polymeric fat acid and a mixture of monocarboxylic acids in which a low aliphatic monobasic acid is employed in admixture with an unsaturated monobasic higher fatty acid with (b) an amine component comprising a mixture of a short chain diamine with a longer chain diamine, and in which the acid component is employed in excess so as to provide an acid terminated product. By acid terminated is meant the resins have a relatively high acid value or number in relation to the amine value. In order to provide the properties of the present invention, the resins should have an acid value in the range of 8-20 and preferably 10-15. The amine value will be about 2, i.e. within the range of about 1.7-2.5. Such values are achieved by employing about 0.92-0.96 amine equivalents per acid equivalent or about 92-96 amine equivalents for 100 acid equivalents or an acid to amine ratio of about 1.04 to 1.09. Preferably about 94 equivalents of amine are employed with 100 acid equivalents for a preferred acid to amine equivalents ratio of about 1.06.

Reaction conditions for the preparation of the polyamide resins may be varied widely. Generally the reaction is carried out at a temperature within the range of about 140°-250° C. Preferably the reaction is carried out at about 200° C. The time of reaction may also be varied widely and will depend somewhat on temperature. Normally a time period of 2 to 8 hours after reaching the selected temperature is required. The preferred time of reaction is about 3 hours. A typical set of reaction conditions is 205° C. for a period of 2-3 hours.

Vacuum may be applied if desired to withdraw volatile by-products and to keep the resin mixture from contact with air which may cause darkening. An inert gas may also be employed to avoid contact with air. Typically the reaction mixture will be heated at the lower temperatures initially to avoid any volatilization and loss of the short chain monobasic acid employed, after which the temperature is raised to the higher reaction temperature. Thus, it is common to heat at about 140° C. for about 1 hour followed by raising the temperature to about 205° C. and reacting for about 1.5–3 hours.

The low aliphatic monobasic acids of the present invention are those of the general formula RCOOH, wherein R is hydrogen or an aliphatic radical of from 1 to 4 carbon atoms. Acids contemplated within the scope of this invention are formic acid, acetic acid, propionic acid, butyric acid, and the like. From a standpoint of physical properties, availability, and economics, acetic acid and propionic acid are the preferred acids of the present invention.

The unsaturated higher fatty acids employed in this invention are those having from 12–22 carbon atoms, more desirably those with 16–20 carbon atoms. The 18 carbon atom acids such as oleic, linoleic and linolenic are the preferred acids, including mixtures thereof, such as the mixture of oleic and linoleic found in tall oil fatty acids.

The polymeric fat acids are well known and commercially available products. The polymeric fat acids which may be employed in preparing the polyamides are those resulting from the polymerization of drying or semi-drying oils or the free fat acids or the simple alcohol esters of these fat acids. The term "fat acids" is intended to include saturated, ethylenically unsaturated and acetylenically unsaturated naturally occurring any synthetic monobasic aliphatic acids containing from 8–24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical" respectively.

The saturated, ethylenically unsaturated, and acetylenically unsaturated fat acids are generally polymerized by somewhat different techniques, but because of the functional similarity of the polymerization products, they all are generally referred to as "polymeric fat acids".

The ethylenically and acetylenically unsaturated fat acids which may be polymerized and their method of polymerization are described in the above mentioned U.S. Pat. No. 3,157,681. The saturated fat acids are generally polymerized by somewhat different techniques than those described in U.S. Pat. No. 3,157,681, but because of the functional similarity of the polymerization products, they are considered equivalent to those prepared by the methods described as applicable to the ethylenically and acetylenically unsaturated fat acids.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, the gas-liquid chromatography (G.L.C.) method was employed in the analysis of the polymeric fat acids employed in this invention. When the gas-liquid chromatography technique is employed, a portion intermediate between monomeric fat acids and dimeric fat acids is seen, and is termed herein merely as "intermediate", since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

Typical compositions of commercially available polymerized fatty acids based on unsaturated $C_{18}$ fat acids are:

$C_{18}$ monobasic acids 5–15% by weight;
$C_{36}$ dibasic acids 60–80% by weight;
$C_{54}$ (and higher) tribasic acids 10–35% by weight.

The products employed in this invention are those in which the dimeric fat acid content ($C_{36}$ dibasic acid) is between 65–75% with about 70% being preferred. The monomeric fat acid content will be about 8 to 12%, preferably about 10 and the trimeric (and higher) between about 10 to 16, preferably about 12%. Any intermediate as noted above will be below 8% and typically at about 6%.

The acid component of the present invention will accordingly be composed as follows:

| Acid Component - 100 equivalents | Eq. % |
|---|---|
| (a) Polymerized fatty acids | 45–55 |
| (b) Unsaturated fatty acid | 15–30 |
| (c) Short chain monobasic acid | 20–35 |
| Carboxyl equivalent percent | 100 |

The polymerized fatty acids will include the residual monomeric monobasic acids as noted in the typical composition of commercially available products above. In the course of polymerization the monomeric acid is modified and is commonly referred to as an "isostearic" acid. The unsaturated fatty acid, component (b) above does not include those acids and the equivalents amount indicated is added unsaturated fatty acid.

As noted earlier, the amine component is a mixture of a short chain diamine such as an alkylene diamine having 2–3 carbon atoms, i.e. ethylene diamine with a longer chain diamine such as an alkylene diamine having 6–10 carbon atoms, i.e. hexamethylene diamine with the short chain diamine comprising more than 50% of the amine equivalents in the amine component. The amine component will accordingly be composed as follows:

| Amine Component - 100 equivalents | Eq. % |
|---|---|
| (a) Short chain diamine | 50–60 |
| (b) Long chain diamine | 40–50 |
| Amine equivalent percent | 100 |

In the examples to follow, the viscosity is the melt viscosity in centipoises (p) measured in a Brookfield Thermosel viscosimeter in accordance with the operating procedures therefrom and is measured at 220° C. Softening points (melting point) of the polyamide resin of the invention were measured by conventional "ball and ring" melting point determination, ASTM method E28-58T.

Color was determined by Gardner color of a 40% non-volatiles solution in the solvent designated. By amine value is meant the number of milligrams of KOH equivalent to the free amine groups in one gram of sample. By acid value is meant the number of milligrams of KOH equivalent to the free acid or carboxyl groups in one gram of sample.

The polyamide resins were prepared according to the following typical procedure below.

TYPICAL POLYAMIDE RESIN PREPARATION PROCEDURE

Employing an acid to amine ratio of 100/94 or 1.06, the acid and amine reactants are charged to a reactor along with an anti-foamant (Dow Corning anti-foam agent) and less than 1% of $H_3PO_4$ (85% solution) as a catalyst. The reactants are heated to a temperature of 140° C. and held at this temperature for one hour before being raised to a temperature of 205° C. at which it is held for 1.5 hours. Vacuum of about 15 mm. is applied for 0.5 hours at the 205° C. after which the temperature is reduced and butylated hydroxy toluene (BHT) as an antioxidant is added prior to discharge of the polyamide resin product.

In the following examples, which illustrate the invention in detail, all percentages and parts are by weight unless otherwise indicated. The polymerized fatty acid employed was polymerized tall oil fatty acids (VERSADYME 204) having the following analysis:

| Saponification Value (S.V.) | 198.5 | |
|---|---|---|
| Acid Value (A.V.) | 189.2 | |
| Thermosel Viscosity (25° C.) | 54.5 | poises |
| Color (Gardner - no solvent) | 7+ | |
| Fe | 3.7 | ppm |
| P | 25 | ppm |
| S | 44 | ppm |
| Iodine Value | 99.9 | |
| % Monomer (M) | 10.9 | |
| % Intermediate (I) | 5.3 | |
| % Dimer (D) | 71.1 | |
| % Trimer (T) | 12.6 | |

EXAMPLE 1

A polyamide resin was prepared following the typical procedure set forth earlier above with the following materials:

| | Weight | | Equivalent |
|---|---|---|---|
| | grams | % | % |
| (a) Polymerized tall oil fatty acids (VERSADYME ® 204) | 269.57 | 53.9 | 50.2 |
| (b) Monomeric unsaturated tall oil fatty acids (ALIPHAT ® 44A) | 90.43 | 18.1 | 16.8 |
| (c) Propionic acid (PA) | 46.54 | 9.3 | 33.0 |
| (d) Ethylene diamine (EDA) | 31.34 | 6.3 | 54.1 |
| (e) Hexamethylene diamine (HMDA) 70% aqueous solution) | 62.12 | 12.4 | 39.9 |

After the cook or reaction schedule at 205° C. was completed, the temperature was reduced, 5 grams of BHT was added and the product discharged.

The product had the following analysis and properties:

| Acid Value | 12.2 |
|---|---|
| Amine Value | 1.7 |
| Softening Point (B & R) | 117° C. |
| Viscosity at 160° C. (Thermosel) | 0.51 p |
| Color (Gardner) | 6 |

EXAMPLE 2

In the same manner as Example 1, a polyamide resin was prepared for the following reactants:

| | Weight | | Equivalent |
|---|---|---|---|
| | grams | % | % |
| VERSADYME ® 204 | 247.5 | 49.50 | 49.4 |
| ALIPHAT ® 44A | 133.7 | 26.74 | 26.6 |
| PA | 31.6 | 6.32 | 24.0 |
| EDA | 29.2 | 5.84 | 54.1 |
| HMDA | 58.0 | 11.60 | 39.9 |

The resulting product has the following analysis and properties:

| Acid Value | 12.1 |
|---|---|
| Amine Value | 2.2 |
| Softening Point (B & R) | 105° C. |
| Viscosity at 160° C. (Thermosel) | 0.44 p |
| Color | 6 |

The resin of Example 1 was dissolved in various solvent mixtures and the Gardner Holdt viscosities observed along with the gel or gellation properties by subjecting varnishes to a conventional freeze/thaw test (4° C./25° C.), measured in minutes. The following examples illustrate the properties in the solvent solutions at high solids levels.

EXAMPLE 3

In this example the solvent system studied was methanol (MTOH), ethanol (ETOH) and hexane (H). The systems, Gardner Holdt viscosity and gel properties are set forth in the following Table I.

TABLE I

| Solvents | \multicolumn{10}{c}{Samples and Solvent Composition} |
|---|---|---|---|---|---|---|---|---|---|---|
|  | 1 | 2 | 3 | 4 | 5 | 6 | 7 | 8 | 9 | 10 |
| MTOH | 50 | 25 | — | 50 | 25 | — | 50 | 25 | — | 100 |
| ETOH | — | 25 | 50 | 25 | 50 | 75 | 50 | 75 | 100 | — |
| H | 50 | 50 | 50 | 25 | 25 | 25 | — | — | — | — |
| Pounds/gallon (#1 gal) | 6.0 | 6.0. | 6.0 | 6.3 | 6.3 | 6.3 | 6.6 | 6.6 | 6.6 | 6.6 |
| Gardner Holdt Viscosity (GHV) | | | | | | | | | | |
| 60% Solids | A2+ | A1 | — | A1− | A1+ | A–B | A1+ | A− | A+ | A2+ |
| 55% solids | A3-4 | A2-3 | A2+ | A2-3 | A2+ | A1- | A1-2 | A1-2 | A1 | A2-3 |
| Gel Test (GT) - minutes | | | | | | | | | | |
| 60% solids | 23/26 | >100 | R.T.GEL | 23/26 | >100 | >100 | >100 | >100 | >100 | 38/39 |
| 55% solids | 6/10 | 24/26 | >100 | 10/14 | 22/25 | >100 | 35/37 | 77/78 | >100 | 29/31 |

EXAMPLE 4 in the same manner as Example 3 samples were evaluated employing solvent systems of methanol, hexane and n-propanol (NPA). The results are as shown below in Table II.

TABLE II

| | \multicolumn{8}{c}{Samples and Solvent Composition} |
|---|---|---|---|---|---|---|---|---|
| | 11 | 12 | 13 | 14 | 15 | 16 | 17 | 18 |
| MTOH | 25 | — | 50 | 25 | — | 50 | 25 | — |
| NPA | 25 | 50 | 25 | 50 | 75 | 50 | 75 | 100 |
| HEXANES | 50 | 50 | 25 | 25 | 25 | — | — | — |
| #1 gal) | 6.0 | 6.0 | 6.3 | 6.3 | 6.4 | 6.7 | 6.7 | 6.7 |
| GHV - 60% | AL+ | — | A1+ | A+ | — | A | D+ | — |
| - 55% | A2 | — | A2− | A1− | A− | A1− | A− | B–C |
| GT - 60% | >100 | R.T.GEL | 20/23 | >100 | R.T.GEL | 45/47 | >100 | R.T.GEL |
| - 55% | 28/31 | R.T.GEL | 8/12 | 24/26 | >100 | 25/27 | 34/35 | >100 |

EXAMPLE 5

In this example the solvent compositions employed were methanol, ethanol and ethyl acetate (EAC). The results are shown in Table III below.

TABLE III

| | \multicolumn{6}{c}{Samples and Solvent Composition} |
|---|---|---|---|---|---|---|
| | 19 | 20 | 21 | 22 | 23 | 24 |
| MTOH | 50 | 25 | — | 50 | 25 | — |
| ETOH | — | 25 | 50 | 25 | 50 | 75 |
| EAC | 50 | 50 | 50 | 25 | 25 | 25 |
| #/gal | 7.0 | 7.0 | 7.0 | 6.8 | 6.8 | 6.8 |
| GHV - 60% | A1-2 | — | — | A1− | A1-A | — |
| - 55% | A3+ | A2− | — | A2-3 | A2 | A1-2 |
| GT - 60% | >100 | R.T. GEL | R.T. GEL | >100 | >100 | R.T. GEL |
| - 55% | >100 | >100 | R.T. GEL | 36/38 | >100 | >100 |

EXAMPLE 6

In this example the solvent compositions were methanol, n-propanol and ethyl acetate. The results are shown in Table IV below.

TABLE IV

| | \multicolumn{5}{c}{Samples and Solvent Composition} |
|---|---|---|---|---|---|
| | 25 | 26 | 27 | 28 | 29 |
| MTOH | 25 | — | 50 | 25 | — |
| NPA | 25 | 50 | 25 | 50 | 75 |
| EAc | 50 | 50 | 25 | 25 | 25 |
| #/gal. | 7.0 | 7.1 | 6.8 | 6.9 | 6.9 |
| GHV - 60% | — | — | A1+ | A | — |
| - 55% | A2− | — | A2− | A1− | C–D (THIXO) |
| GEL - 60% | R.T. GEL | R.T. GEL | 57/60 | >100 | R.T.GEL |
| - 55% | >100 | R.T. | 23/26 | >100 | >100 |

TABLE IV-continued

| | \multicolumn{5}{c}{Samples and Solvent Composition} |
|---|---|---|---|---|---|
| | 25 | 26 | 27 | 28 | 29 |
| | \multicolumn{5}{c}{GEL} |

EXAMPLE 7

The resin of Example 2 was formulated into compliant, white flexographic inks as follows:

| | | \multicolumn{2}{c}{Sample} |
|---|---|---|---|
| Component | (#/gal) | A | B |
| Titanium dioxide | (34.2) | 50.00% | 50.00% |
| Resin of Ex. 2 | (8.0) | 28.10% | 29.40% |
| MTOH | (6.6) | 10.95% | 10.3% |
| ETOH | (6.6) | 10.95% | — |
| H | (5.5) | — | 10.3% |
| | | 100.00% | 100.00% |

From the foregoing examples, it can be seen that varnishes of the resin can be prepared at high solids levels for flexographic inks. Ethanol is one of the preferred solvents commonly employed with flexographic inks and good results are seen in sample 9 of Table I. The addition of methanol or hexane, particularly with the use of n-propanol (in place of the ethanol) is desirable. The use of methanol along with ethyl acetate also provides desirable results. The preferred solvents are the alcohol solvents such as the lower aliphatic hydrocarbon alcohols, alone or in admixture, i.e. the alkanols containing from 1–5 carbon atoms such as methanol, ethanol and propanol which are the more preferred. The alcohols can be employed admixed with other cosolvents having an evaporation rate substantially the same as the base alcohol solvent employed. Illustrative cosolvents are the alkyl (1–5 carbon) acetates and typical hydrocarbon solvents such as the aliphatic or cyclo aliphatic hydrocarbons having from 6–12 carbon atoms.

The embodiments of the present invention in which an exclusive property or privilege is claimed are defined as follows:

1. A polyamide comprising the condensation product of (A) an amine component comprising from 50–60 equivalent percent of a short chain diamine having from 2–3 carbon atoms and 40–50 equivalent percent of a long chain diamine having 6–10 carbon atoms and (B) an acid component comprising from 45–55 equivalent present of a polymerized fatty acid having a dimeric fat acid content between 65–75% by weight, 15–30 equivalent percent of an unsaturated monobasic fatty acid having from 12–22 carbon atoms and the remainder of the acid component being a lower aliphatic monobasic acid of the formula RCOOH where R is hydrogen or an aliphatic hydrocarbon radical of 1–4 carbon atoms, the equivalents ratio of acid equivalents from said acid component to amine equivalents from said amine component being in the range of about 1.04–1.09.

2. A polyamide as defined in claim 1 wherein said short chain diamine is ethylene diamine and said long chain diamine is hexamethylene diamine.

3. A polyamide as defined in claim 2 wherein said ehtylene diamine is employed is an amount of about 54 equivalent percent of said amine component and said hexamethylene diamine is employed in an amount of about 40 percent of said amine component.

4. A polyamide as defined in claim 1 wherein said polymerized fatty acid is polymerized tall oil fatty acids, said unsaturated fatty acid in tall oil fatty acids and said lower aliphatic monobasic acid is propionic acid.

5. A polyamide as defined in claim 4 wherein said polymerized tall oil fatty acid is employed in an amount of about 50 equivalent percent of said acid component.

6. A polyamide as defined in claim 5 wherein said unsaturated fatty acid is employed in an amount of about 17% and said propionic acid is employed in an amount of about 33 equivalent percent of said acid component.

7. A polyamide as defined in claim 5 wherein said unsaturated fatty acid is employed in an amount of about 20 equivalent percent and said propionic acid is employed in an amount of about 24 equivalent percent of said acid component.

8. A polyamide as defined in claim 1 having an acid value in the range of 8–20 and an amine value of about 2.

9. A polyamide as defined in claim 8 having an acid value in the range of 10–15.

10. A polyamide as defined in claim 8 having an acid value of about 12.

11. A solution of the polyamide resin of claim 1 in an alcoholic solvent.

12. A solution as defined in claim 11 wherein said alcoholic solvent is ethanol.

13. A solution as defined in claim 12 wherein said ethanol is admixed with methanol.

14. A solution as defined in claim 11 and further containing a co-solvent having an evaporation rate substantially the same as said alcohol solvent.

* * * * *